United States Patent [19]
Yeckley

[11] Patent Number: 5,096,864
[45] Date of Patent: Mar. 17, 1992

[54] PROCESS OF SPRAY DRYING SIALON

[75] Inventor: Russell Yeckley, Oakham, Mass.

[73] Assignee: Norton Company, Worcester, Mass.

[21] Appl. No.: 584,551

[22] Filed: Sep. 18, 1990

[51] Int. Cl.$^5$ .............................................. C04B 35/58
[52] U.S. Cl. ....................................... 501/98; 501/96; 501/97
[58] Field of Search ....................... 501/89, 92, 97, 98; 264/12

[56] References Cited

U.S. PATENT DOCUMENTS

| | | | |
|---|---|---|---|
| 4,935,389 | 6/1990 | Umebayashi et al. | 501/98 |
| 5,001,091 | 3/1991 | Pujari et al. | 501/103 |

*Primary Examiner*—William R. Dixon, Jr.
*Assistant Examiner*—Alan Wright
*Attorney, Agent, or Firm*—Volker Ulbrich

[57] ABSTRACT

A process for improving the strength of a sialon powder formed by a spray drying process is disclosed. The process involves the addition of small amounts of a hydrophilic silane to the slurry of inorganic powders and water which is fed to the spray dryer.

14 Claims, No Drawings

PROCESS OF SPRAY DRYING SIALON

BACKGROUND OF THE INVENTION

Ceramic materials are becoming widely used in industry today. Ceramics because of their lower costs and weight are being substituted for steel and other metal-based materials in the construction of a variety of devices and machine parts. For example, ceramics are being used as replacements for steel and other metal materials in the manufacture of car bodies, airplane parts, turbine blades, flow control valves, engine parts, cutting tools, canning dies, and forging dies.

Similar components manufactured from alumina or zirconia are pressed from spray dried powders. The spray dry process agglomerates the high surface area powders with an organic that binds the particles together. The agglomerates are nearly spherical in shape and will flow uniformly filling dies of the desired shape. The powder is unaxially pressed at up to 30,000 psi, compacting the agglomerates. The binders allow the particle to rearrange during the process forming a uniform green body which after sintering yields high strength parts.

Sialon, an acronym for silicon aluminum oxynitride, is a particularly useful ceramic material which is generally prepared from a mixture of silicon nitride, alumina, aluminum nitride, and a sintering aid such as yttria or other rare earth oxide. As used herein, sialon powder includes any powder blend containing such a combination of components.

Aqueous processes have not previously been useful for preparing fine sialon powders because the nitride powder components react with water forming hydroxides on the particle surfaces and ammonia. During the drying step, whether cone blending or spray drying, very hard agglomerates are produced which do not compress during the green forming operation and which generate low density secondary agglomerates during subsequent sintering, reducing the strength of the final component.

Typically, fine sialon powder is produced by a non-aqueous process of milling in an alcohol such as isopropanol. The alcohol must then be evaporated using vacuum dryers, cone blenders, or spray dryers. Capital costs and operating costs are also increased over water milling due to the safety measures required when handling the organic solvents.

It is an object of the present invention to produce a sialon powder by an aqueous spray drying process. It is a further object to produce a sialon powder having improved strength as compared to prior such powders.

SUMMARY OF THE INVENTION

The present invention is directed to an improved process for producing sialon powder yielding sintered bodies having improved strength, i.e. >100 ksi as compared with bodies formed from powders prepared by the conventional spray drying process. The process employed in the present invention generally comprises adding a silane to distilled water and an organic dispersant, mixing the resultant liquid solution with the blend of inorganic materials used to produce the sialon powder so as to form a slurry, processing the slurry by conventional techniques, and spray drying it. The silanes useful as additives in the present invention are the hydrophilic silanes. The resulting sialon powder and sintered components manufactured therefrom exhibit improved strength. The addition of the silane also has been found to improve the quality of the spray dried powder and the final component reliability.

It is currently believed that the silane additive acts as a coupling agent which decreases hydroxide formation on the surface of the silicon nitride and aluminum nitride particles. The silane results in the substantial elimination of low density agglomerates, thereby improving the strength of the resultant sintered component.

DETAILED DESCRIPTION OF THE PREFERRED EMBODIMENTS

The sialon products of the present invention, which are improved by the process of the present invention, comprise silicon aluminum oxynitride in combination with a glassy phase. According to the process of the invention, the sialon is formed by mixing together as powder blend of silicon nitride, alumina, aluminum nitride, and a sintering aid such as yttria, lanthana, or other rare earth oxide.

In the powder blend, the silicon nitride is generally present in an amount of from about 75 to 95% by weight of the powder blend and more preferably in an amount of from about 82 to 90% by weight. The aluminum nitride is generally present in an amount of from about 1 to 10% by weight and more preferably in an amount of from about 2 to 6% by weight. The alumina is present in an amount of from about 2 to !0% by weight and more preferably in an amount of from about 3 to 5% by weight. The sintering aid is generally present in an amount of from about 3 to 10% by weight and more preferably in an amount of from about 4 to 8% by weight.

The powder blend is added to a dispersion of water, a dispersant, and a silane to form a slurry. The powder blend is added in an amount sufficient to form a slurry having at least about 50% solids content, more preferably a solids content of from about 55 to 75%. High solids levels are required to maximize output and minimize formation of hollow spheres and donuts during the spray drying.

The silane additives useful in the process of the invention are hydrophilic. Silanes obtain a hydrophilic nature from their terminal function groups. For example, silanes having an amino terminal functional group are generally hydrophilic. In contrast, silanes having a phenyl or a methyl functional terminal group are hydrophobic and not suitable for use in the process of this invention. Silanes with chlorine and fluorine are also unacceptable because fluorine and chlorine have been found to retard densification and lower mechanical properties. Specific examples of silanes which may be employed include aminopropyltrimethoxysilane, 3-glycydoxypropylmethyldiethoxysilane, 6-aminohexylaminopropyltrimethoxysilane, N-(2-aminoethyl)-3aminopropyltrimethoxysilane and 4-aminobutyldimethylmethoxysilane. A single silane may be employed or mixture thereof may be used.

While all hydrophilic silanes are generally useful in the present invention, particularly suitable silanes for a specific composition may be determined by routine screening by attempting to form a low viscosity slip with sialon at about 60 to 70% solids. In the screening procedure, a silane is added to deionized water and mixed. A sialon powder blend is then added to the silane mixture with such as a lightening mixer and an organic dispersant such as sodium polyacrylate or ammonium polyacrylate. All of the components are blended together for about 5 to 10 minutes. The silanes that are most effective will yield the lower viscosity slips. The silanes that are not suitable for the process form slips that do not flow and appear dry. Table I shows the results of this screening test for a number of silanes. The silanes that are not flowable are not usable in the process of this invention. The dispersant used was a sodium polyacrylate, i.e. XFS from Dow Chemical. The percent silane and percent dispersant are given in weight percent based on the weight of the powder. Shear stress is measured in a Brookfield viscometer with UL adapter at 30 rpm.

TABLE I

| Silane* | % Silane | % Dispersant | % Solids | Shear Stress (dynes/cm$_2$) |
|---|---|---|---|---|
| 1 | 0.25% | 0.1% | 65 | not flowable |
| 2 | 0.25% | 0.1% | 65 | not flowable |
| 3 | 0.25% | 0.1% | 65 | not flowable |
| 4 | 0.2 | 0.1% | 60 | 2.6 |
| 5 | 0.2% | 0.3% | 68.3 | 3.4 |
| 6 | 0.2% | 0.6% | 66.2 | 3.8 |
| 7 | 0.2% | 0.1% | 60.0 | flowable |
| 8 | 0.2% | 0.27% | 65.8 | 1.1 |

*Silane Key:
1) Phenylaminoalkytrimethoxysilane
2) Phenyltrimethoxysilane
3) Hexamethyldsilazane
4) 3-Glycidoxyproplymethydiethoxysilane
5) 6-Aminohexylaminopropyltrimethoxysilane
6) N-(2-aminoethly)-3-aminopropyltrimethoxysilane
7) 4-Aminobutyldimethylmethoxysilane The silane is generally present in an amount of from about 0.1 to 2% by weight of the powder, more preferably in an amount of from about 0.2 to 0.5% by weight. While more of the silane could be used, it is generally desirable to use as low a level as will insure coverage of particle surfaces by the silane coupling agents.

The dispersant is generally present in the slurry in an amount of from about 0.05 to 0.5% by weight of the powder and more preferably in an amount of from about 0.05 to 0.25% by weight.

The slurry which is formed from the sialon powder blend, silane, water and dispersant is milled, preferably for about 60 to 90 minutes, circulated through a magnetic separator to remove any iron particles for about 15 minutes, passed through a screen mesh, preferably an about 15 micron mesh, deaerated and spray dried using conventional spray drying equipment. The spray dried powders are pressed into 3 inch square by quarter inch thick tiles at 5000 psi and then isopressed to 30,000 psi. The green tile is then air fired at 600° C. for 60 minutes in 1 atmosphere nitrogen. The resulting densified sialon powder component have densities of greater than about 3.23, preferably about 3.25 to 3.27, and strengths of greater than about 100 ksi, preferably about 110 ksi.

Conventional ceramic spray dry process technology also includes the optional use of organic binders in the slip as both a lubricant and binder. They often facilitate the deformation of the agglomerates during the green forming operation and impart green strength for handling and green finishing. Some typical binders useful herein include polyethyleneglycols, polyvinylalcohol, polyvinylbutyrol, methylcellulose, and glycerol.

The following examples are illustrative of the present invention. All parts and percents are by weight unless otherwise specified.

EXAMPLE 1

The total water needed to yield a 70% solids slip for 8000 gms of powder is added to a continuous attrition mill and 0.1% A1100 silane which is aminopropyltrimethoxysilane is added to the water. The powder composition is 85.8% silicon nitride, 7.4% yttria, 3.0% alumina and 3.8% 21R polytype (solid solution of AlN, $Si_3N_4$ and $Al_2O_3$ having the formula $Al_6SiN_6O_2$) The powder is slowly added to a mill circulating tank until about ⅜ of the powder has been dispersed into the water. A sodium polyacrylate dispersant, 0.1%, is added before the addition of the remaining powder. The slurry is circulated through the mill for about 60 to 90 minutes. During the last 20 minutes, the slip is also circulated through a magnetic separator. The slip is then wet screened through a 15 micron screen and placed into a holding tank for pumping into a spray dryer. The spray dryer operating conditions are 248° C. inlet temperature, 95° C. outlet temperature, 45 cfm air flow, and 60 psi nozzle pressure. The dried powder is collected from both the chamber and cyclone. The chamber powders are larger agglomerates than the powder collected in the cyclone. The chamber powder product is screened through a 140 U.S. mesh screen to remove large particles that may have fallen off the nozzle and sidewalls of the dryer. Tiles 3 inch square by ¼ inch thick are die pressed to 5,000 psi and then isopressed to 30,000 psi from the −140 mesh chamber and cyclone powders. The tiles are air fired to 600° C. for 10 hours and then sintered at 1800° C. for 60 minutes in 1 atm nitrogen. The tiles are machined into 3 mm×4 mm×50 mm flexure bars. Flexure tests are conducted on 4 point quarter point fixture with a 40 mm outer span at a crosshead speed of 0.02 in./min. The fracture toughness is determined by control flaw-strength technique. The results are shown in Table II.

EXAMPLE 2

The procedure of Example 1 is repeated except that the silane content is increased to 0.2%. The results are shown in Table II.

EXAMPLE 3

The procedure of Example 1 is repeated except that the percent solids is 65% and the silane content is increased to 0.3%.

EXAMPLE 4

The procedure of Example 1 is repeated except that the percent solids is 65% and the silane content is increased to 0.4%.

EXAMPLE 5

The procedure of Example 1 is repeated except that the percent solids is only 65% and the silane is N-(2-aminoethyl)-aminopropyltrimethyloxysilane which is used at a level of 0.1%.

EXAMPLE 6

The procedure of Example 5 is repeated except that the solids level is 70% and the silane level is 0.3%.

EXAMPLE 7

The procedure of Example 5 is repeated except that the solids level is 70% and the silane level is 0.5%.

EXAMPLE 8

The procedure of Example 5 is repeated except that the solids level is 60% and the silane level is 0.5%.

COMPARATIVE EXAMPLE A

The procedure of Example 1 is repeated except that the silane is omitted completely and the solids level is 65%. The test results are shown in Table 2.

COMPARATIVE EXAMPLE B

The procedure of Example 1 is repeated except that the silane is replaced by phenylaminoalkyltrimethoxysilane, a hydrophilic silane. The resultant slurry had too high a viscosity to be fed to the spray drier.

COMPARATIVE EXAMPLE C

The procedure of Comparative Example B is repeated except that the silane is replaced with (i) phenyltrimethoxysilane and (ii) trimethyltrimethoxysilane. Neither silane produced a sufficiently low viscosity slurry to be spray dried.

TABLE II

Sintered Strength of Spray Dried Sialon Powders

| Example | Chamber Powder Avg. Strength (ksi) | Cyclone Powder Avg. Strength |
|---|---|---|
| 1 | 100 | 103.5 |
| 2 | 112.6 | 108.5 |
| 3 | 115.7 | 108.1 |
| 4 | 118.0 | 94.9 |
| 5 | 114.5 | 116.9 |
| 6 | 110.2 | 107.3 |
| 7 | 107.8 | 122.9 |
| 8 | 115.9 | 120.0 |

All averages were for 10 or more flexure tests.

EXAMPLE 9

The powder composition used contained 85.8 wt % silicon nitride, 7.4 wt % yttria, 3.0 wt % alumina, and 3.8 wt % 21R polytype. The water required to yield a 70 wt % solids slip for a powder weight of 15 kilograms is added to a netszch mill with 0.1 wt % of XFS dispersant. The sialon powder mix is slowly added to the netszch mill operating at 1200 rpm. The slip is milled for 2 hours and during the final 20 minutes the slip is circulated through a magnetic separator. The slip is wet screened through a 15 micron screen and into a holding tank. Glycerol (3.0%) and polyvinyl alcohol (0.16%) are used s the binder to improve green strength and green handling of the pressed bodies. The binder is added at the holding tank and stirred with a lightening mixer for 15 minutes. The spray dryer conditions are 248.C. inlet temperature, 95° C. outlet temperature, 45 cfm air flow, and 60 psi nozzle pressure. The powder collected from the chamber was screened to −80 U.S. mesh to remove irregular shaped agglomerates that fell from the sidewalls. The powder collected at the cyclone was processed without screening. Tiles were processed from each powder as described in Example 1 and are referred to as 9A in Table III.

The same procedure as above was repeated except that 0.3 wt % A1100 silane was added with the water and the 0.1 wt % XFS was not added until approximately two thirds of the powder had been added to the water. The tiles produced are referred to as 9B in Table III. As can be seen from the results, the sintered strengths are substantially higher when the hydrophilic silane is included as an additive to the spray dry process. This improvement is most evident for the strength achieved with the cyclone powders. The smaller standard deviation in strengths in sample 9A is due to the large frequency of agglomerates controlling failure.

TABLE III

| Sample | Strength Summary of Chamber Powder (ksi) | | | | Strength Summary of Cyclone Powder (ksi) | | | |
|---|---|---|---|---|---|---|---|---|
| | AVG | MIN | MAX | SD | AVG | MIN | MAX | SD |
| 9A | 76.8 | 73.9 | 82.3 | 3.4 | 76.6 | 73.3 | 78.6 | 2.2 |
| 9B | 88.3 | 79.2 | 96.3 | 5.1 | 121.7 | 104.3 | 139.0 | 9.3 |

I claim:

1. In a process for increasing the strength of a densified body prepared from a sialon powder formed by a spray drying process, the improvement comprising adding a hydrophilic silane to a powder blend of inorganic powders used to form the sialon powder.

2. The process of claim 1, wherein the hydrophilic silane is selected from the group consisting of aminopropyltrimethoxysilane, 3-glycydoxypropylmethydiethoxysilane, 6-aminohexylaminopropyltrimethoxysilane, N-(2-aminoethyl)-3-aminopropyltrimethoxysilane, and 4-aminobutyldimethylmethoxysilane.

3. The process of claim 1, wherein the hydrophilic silane is added in an amount sufficient to increase the strength of the sialon densified body by at least about 10%.

4. The process of claim 1, wherein the silane is added in an amount of from about 0.1 to 2% by weight of the powder blend.

5. A process for forming an improved strength sialon component which comprises (i) forming a slurry comprising a powder blend of components used to form the sialon, water, a dispersant, and a hydrophilic silane; (ii) milling the slurry; (iii) spray drying the milled slurry to form a spray dried sialon powder; (iv) forming the spray dried sialon powder into the shape of a component; and then (v) densifying said shaped powder to form the component.

6. The process of claim 5, wherein the hydrophilic silane is added in an amount of from about 0.1 to 2% by weight of the powder blend.

7. The process of claim 5, wherein the hydrophilic silane is selected from the group consisting of aminopropyltrimethoxysilane, 3-glycydoxypropylmethydiethoxysilane, 6-aminohexylaminopropyltrimethoyxsilane, N-(2-aminoethyl)-3-aminopropyltrimethoxysilane, and 4-aminobutyldimethylmethoxysilane.

8. The process of claim 5, wherein the powder blend of components used to form the sialon comprises silicon nitride, alumina, aluminum nitride, and a sintering aid.

9. The process of claim 5, wherein the slurry further contains an organic binder.

10. A slurry comprising (i) a powder blend of components which combine form sialon, (ii) water, (iii) a dispersant, and (iv) a hydrophilic silane.

11. The slurry of claim 10, wherein the hydrophilic silane is present in an amount of from about 0.1 to 2% by weight of powder.

12. The slurry of claim 10, wherein the hydrophilic silane is selected from the group consisting of aminopropyltrimethoxysilane, 3-glycydoxypropylmethydiethoxysilane, 6-aminohexylaminopropyltrimethoxysilane, N-(2-aminoethyl)-3-aminopropyltrimethoxysilane and 4-aminobutyldimethylmethoxysilane.

13. The slurry of claim 10, wherein the powder blend of components used to form sialon are present in amount of about 55 to 75% by weight of the powder and the water, the dispersant is present in an amount of from about 0.05 to 2% by weight of the powder, the water is present in an amount of from about 45 to 25% by weight of the powder and the water, and the silane is present in an amount of from about 0.1 to 2% by weight of the powder.

14. The slurry of claim 10 further containing an organic binder.

* * * * *